June 30, 1931.        W. Z. LINDERS        1,812,798
LUBRICATING APPARATUS
Filed Sept. 26, 1930        2 Sheets-Sheet 1
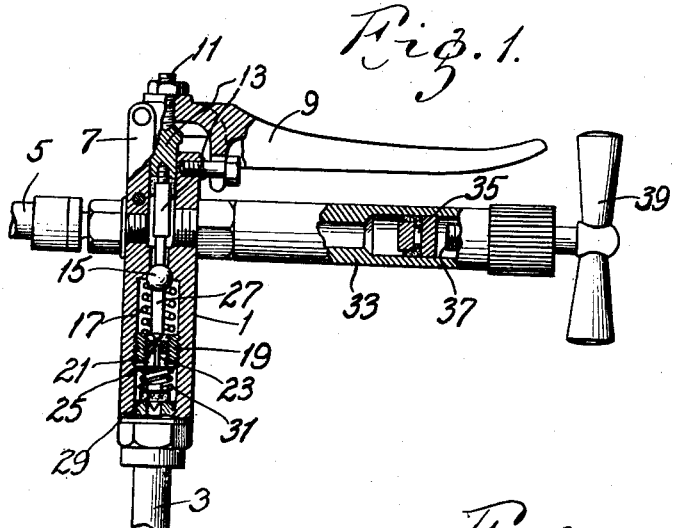
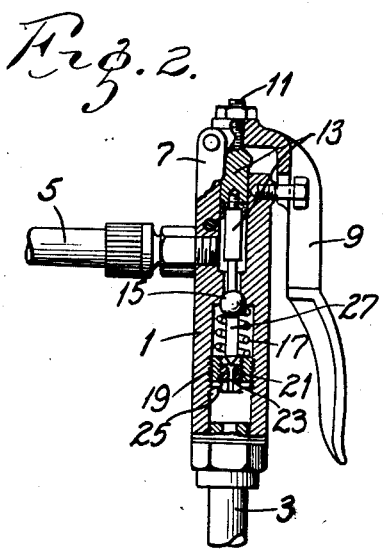
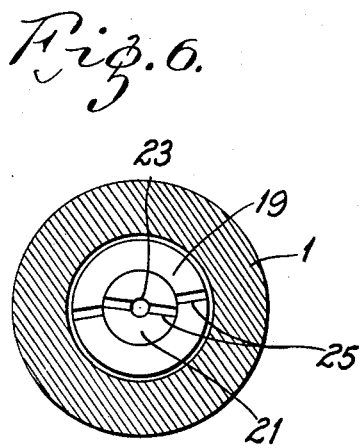
William Z. Linders,
Inventor.

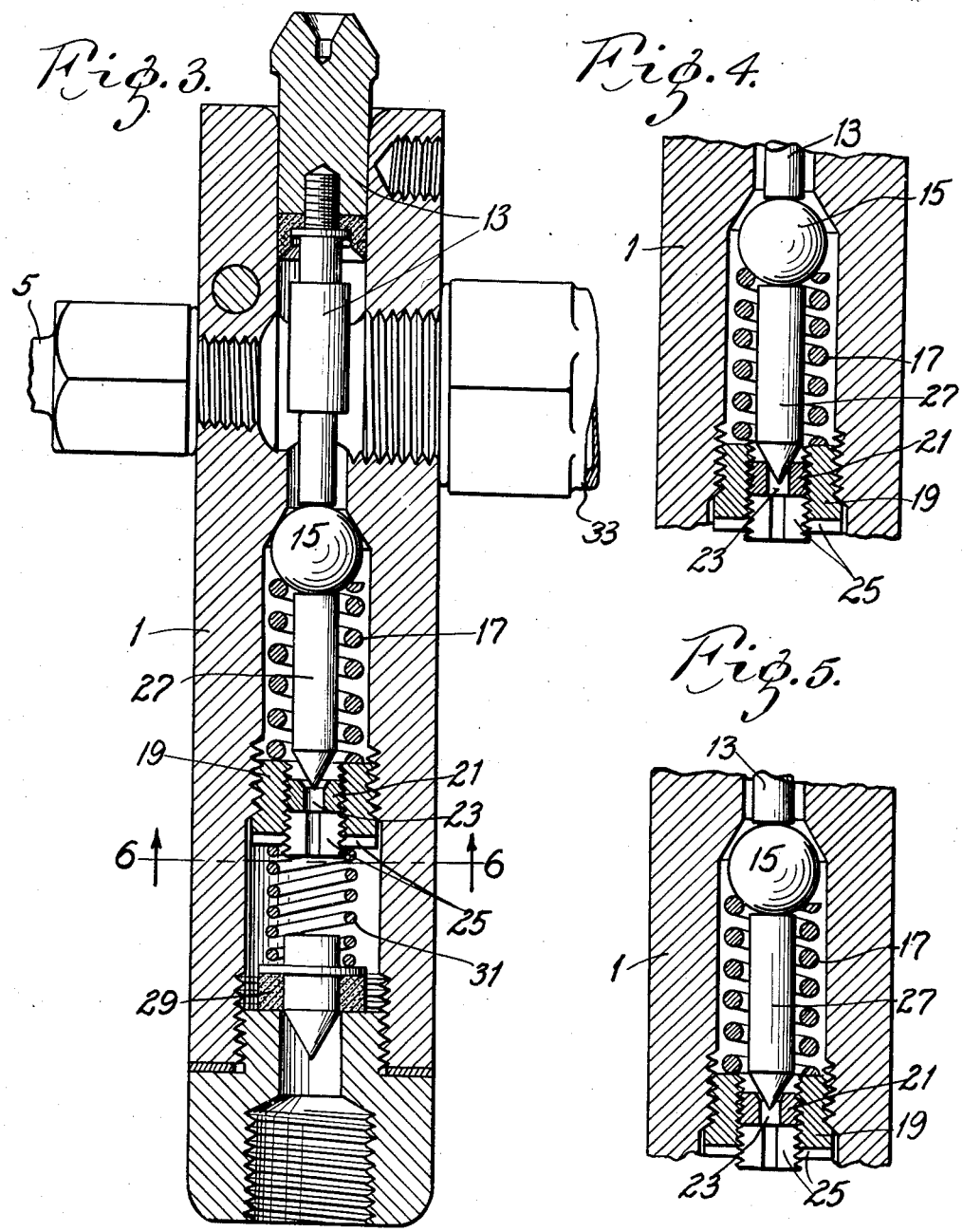

Patented June 30, 1931

1,812,798

UNITED STATES PATENT OFFICE

WILLIAM Z. LINDERS, OF NORMANDY, MISSOURI, ASSIGNOR TO LINCOLN ENGINEERING COMPANY, OF ST. LOUIS, MISSOURI, A CORPORATION OF MISSOURI

LUBRICATING APPARATUS

Application filed September 26, 1930. Serial No. 484,582.

This invention relates to lubricating apparatus, and with regard to certain more specific features, to a control for such apparatus.

Among the several objects of the invention may be noticed the provision of means for manually or otherwise controlling a supply of fluid such as grease under pressure from a high pressure lubricating pump; the provision of means of the class described which is adapted under one condition of operation to deliver substantially measured quantities of grease without loss; the provision of means of the class described which will under other conditons of operation, provide a steady, fully controlled flow which may be varied; and the provision of apparatus of the above description for fulfilling the above criteria which is exceedingly simple and compact in form. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a side elevation, showing the invention applied to one form of apparatus, parts being broken away for clarity;

Fig. 2 is a view similar to Fig. 1, showing the invention applied to another form of apparatus;

Fig. 3 is an enlarged vertical section showing the valve structure of the present invention in one closed position;

Fig. 4 is a fragmentary view similar to Fig. 3, but showing said valve structure in an opposite closed position;

Fig. 5 is a view similar to Fig. 4, showing said valve in an intermediate position; and, Fig. 6 is a cross section taken on line 6—6 of Fig. 3, a spring 31 being eliminated for clarity.

Similar reference characters indicate corresponding parts throughout the several views of the drawings.

Referring now more particularly to Figs. 1 and 2, there is illustrated at numeral 1 a chambered body which is placed in connection with an inlet line 3, said line 3 proceeding from a grease pump such as the high pressure grease pump shown and described in Barks' Patent 1,654,673 of January 3, 1928, although I do not wish to be limited to such a pump for obtaining pressure. An outlet line 5 proceeds from the body 1 and is adapted to deliver grease or the like to a desired location, such as bearings. It is optional what kind of a connection is used at the end of outlet 5, for communicating it with the bearing or like passage, but the present invention is particularly, though not only, directed to the type of connection which comprises a socket on the end of the outlet 5, which socket is adapted to be temporarily pressed into communication with the fitting used for delivering grease to the bearings, there being ordinarily used no positive coupling means. However, the invention also has certain advantages where positive coupling means are used, as will be shown.

At numeral 7 is shown a bridle link to which is pivoted an operating handle 9, said handle having slightly different forms in the two modifications. The operating handle 9, by means of an adjustable set screw 11, is adapted to press down a sealed plunger 13 which reacts against a ball check valve 15 to open the same against closing action by a spring 17. The spring 17 reacts against an oppositely located bushing 19.

Interiorly of the bushing 19 is adjustably threaded a valve seat 21 which has a central opening 23 for the passage of grease. Both the bushing 19 and the valve seat 21, are provided with slot 25 for seating and/or adjusting purposes. Between the ball check valve 15, and the seat 21 is positioned a loosely mounted, self centering metering pin 27. The size and position of the ball check 15 and metering pin 27 are such that when the ball check 15 is closed the pin 27 is forced to a wide open position, or may be so forced as illustrated in Figs. 1, 2 and 3.

Or, under operation of handle 9, the plunger 13 may be depressed and the ball check 15 unseated, the metering pin 27 being seated in its valve seat 21, as shown in Fig. 4, thus opening the outlet of the body 1 and closing its inlet.

On the other hand, both the ball check 15, and the metering pin 27 may assume an intermediate position and be unseated, as shown in Fig. 5. The function of these various positions of ball check 15 and metering pin 27 will be clarified hereinafter.

The difference between the construction shown in Figs. 1 and 2 is merely that in Fig. 1, there is used an inlet check valve 29, including a spring 31 and opening down stream for operating in conjunction with a pressure boosting cylinder 33, having a piston 35 adapted to be moved by a screw 37. The screw 37 is under manual control of a handle 39. Thus if a flow comes through the line 3 and passes through the body 1 to the line 5 and thereafter becomes obstructed, the obstruction may be removed by turning the handle 39 and raising the pressure in the outlet line 5, this being done against the closed check 29. Hence the pressure can be boosted above that in the line 3. The pressure boosting parts are not shown in Fig. 2. The two alternatives shown in Figs. 1 and 2 are given merely by way of example of the different applications of the invention.

The operation of the invention is included in the following:

Assuming high pressure grease should be available at inlet line 3, this grease is checked at the check valve 15. In prior constructions wherein the metering pin 27 and valve seat 21 were not used (see for instance, Patent 1,633,304), whenever the handle 9 was depressed it was necessary to exert manual pressure against the pressure in line 3, said pressure in line 3 being exerted on the projected area of the ball check 15. This area being considerable, there was a considerable resistance to pressing the handle 9. Finally, when the ball check 15 did unseat, it was unseated suddenly, because of the high pressure then exerted on the handle 9.

Thus it will be seen that with a sudden and complete opening of the check 15, there would ordinarily occur a sudden rush of a large volume of grease under a high pressure into the line 5. This rush of a large volume under high pressure meets the restricted opening of the inlet fitting to the bearing where a high frictional resistance is engendered. The fitting, not having the capacity to accommodate the grease, there occurs a reaction on that which is holding the connection to the fitting, and in the case of a hand pressure connection would depend upon the pressure of the operator's hand. Hence there is a weakening of the connection and a loss of grease. Not only is the direct loss of grease undesirable, but it projects itself on surrounding parts. Another difficulty met with is that once the valve such as 15 is opened under the old condition, it is difficult to gradually close it or to partially close it so as to throttle the flow to a desired rate. Even with couplers having a positive connection with their fittings the invention is advantageous, because the tendency to leakage is reduced.

The relatively uncontrollable pressure which must be exerted at the handle 9 in order to unseat the ball 15, results in a complete stroke of the handle 9 over the entire limit of motion. This stroke is effected substantially and almost instantaneously, and it effects the seating of the metering pin 27 on its seat 21. This resulted in practically a measured charge proceeding through the outlet 5. The measure of the charge is practically determined by the substantially constant period of time that it takes the pin 27 to travel through a seat under the opening condition described. It should be understood that the opening action of the valve 15 and opening movement of the handle 9 is a somewhat discontinuous function of the time, because when the valve 15 does open, the reacting pressure on the valve becomes balanced to a degree. In other words, practically all of the pressure (ignoring the relatively small amount due to spring pressure) is eliminated almost instantaneously, so that with the full manual pressure of the handle 9 it is difficult to control its movement otherwise than to effect a practically instantaneous full stroke. This phenomenon is taken advantage of in the present invention by permitting it to effect a full stroke from opening of the valve 15 to closing of the metering pin 27, this stroke necessarily taking said substantially constant period of time and resulting in a substantially measured quantity of grease being ejected without a continuous deleterious rush. The quantity, may be determined by the adjustment of the valve seat 21, which may be adjusted to prevent an abnormal reaction in the fitting and thus to prevent outward escape of grease. The conditions at the beginning and end of the full stroke are shown in Figs. 3 and 4 respectively.

After the full stroke, at which time the metering pin 27 has seated the seat 21, the projected area of said pin 21 exposed to the pressure in the line 3 is small, and it is then possible to gradually reduce the manual pressure on the handle 9 so as to gradually "crack" open the valve comprising the metering pin 27 and let a desired rate of flow take place. This flow can take place because, under these conditions, the check valve 15 is not as yet closed. It will be seen from Fig. 5 that there is a range of movement from closed position of the metering pin on the one hand to open position thereof with closed position of the cleck valve 15 on the other hand, which permits an adjustment of the rate of flow. Flow under these conditions does not result in grease leakage, because the metering pin may be slowly opened, and impact prevented. The flow here referred to is continuous. That referred to under the downward action of handle 9 is not continuous. Thus there is effected a construction which by simple means permits a measured discharge or continuous discharge. The continuous and non-continuous discharge takes place under optimum conditions.

The two motions of operation above set out have their distinctive uses. Ordinary bearings require only a small amount of grease and the measured - quantity - operation is adapted to serve under such conditions. Other devices such as gear boxes and the like, may be filled after pushing down the handle knife and then relieving pressure thereon until the metering pin 27 is opened. At any time that it is desired to cut off the continuous flow, pressure may be relieved from the handle 9 and the flow is consequently almost instantaneously cut off.

The compactness of the construction also lends to its utility. The ball check and seat being separated from the metering pin 27, permits independent alignment of said pin. At the same time the pin is maintained in a substantially longitudinal position by means of the surrounding coil spring 17.

It is to be understood herein that the term "measured flow" refers to a temporary flow or interrupted flow of such a short period and taking place under such conditions that a relatively small amount of material is discharged as distinguished from a continuous flow which may be cut off at any of various long intervals by an operator. The measurement is substantial rather than precise. It has for its purpose the holding back of an excess, rather than delivery of precisely fixed quantities.

Ordinarily control rests with how successfully an operator can limit the time in which the valve is open for the passage of grease. When a valve is opened against pressure the muscles of the hand operating the valve become tense upon the opening operation and must become partially relaxed before the closing operation can take place, whereas, in this device the metering pin stops the flow while the muscles are still tense, and maintains a closed valve during the period of time that the muscles can become adjusted to release the valve handle.

In view of the above it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In lubricating apparatus, a body forming a passage for a stream of fluid, said passage having an inlet and an outlet, a valve seating downstream toward the outlet, a metering member extending toward the inlet and adapted to close said inlet upstream against pressure entering the same, the area of said valve as projected against pressure from the inlet being greater than the similar area of the metering member when the metering member is closed against pressure from the inlet.

2. In lubricating apparatus, a body forming a passage for a stream of fluid, said passage having an inlet and an outlet, a valve seating downstream toward the outlet, a metering member extending toward the inlet and adapted to close said inlet upstream against pressure entering the same, and operating means mounted on said body adapted to effect manipulation of the valve and pin independently of reactions extraneous of said apparatus.

3. In lubricating apparatus, a body forming a passage for a stream of fluid, said passage having an inlet and an outlet, a valve seating downstream toward the outlet, a metering member extending toward the inlet and adapted to close said inlet upstream against pressure entering the same, and operating means mounted on said body adapted to effect manipulation of the valve and pin independently of reactions extraneous of said apparatus, said operating means providing an operating mechanical advantage.

4. In apparatus of the class described, a body having a passage and an outlet including a valve seat, a check valve seating downstream toward the outlet, a spring located longitudinally in said passage for normally maintaining said check valve seated, a metering pin located axially within said spring and extending toward the inlet and adapted to close said inlet upstream against pressure entering the same.

5. In apparatus of the class described, a body having a passage and an outlet including a valve seat, a check valve seating downstream toward the outlet, a spring located longitudinally in said passage for normally maintaining said check valve seated, a metering pin axially located within said spring and extending toward the inlet and adapted to close said inlet upstream against pressure entering the same, and means for adjusting the position of the inlet seat.

In testimony whereof, I have signed my name to this specification this 22nd day of September, 1930.

WILLIAM Z. LINDERS.